United States Patent Office 3,600,190
Patented Aug. 17, 1971

3,600,190
PRODUCTION OF ANIMAL FEED FROM SUGAR
CANE STRIPPING MILL
William W. Worden, P.O. Box 1053,
Ewa, Hawaii 96706
No Drawing. Filed May 12, 1967, Ser. No. 637,937
Int. Cl. A23k 1/06
U.S. Cl. 99—8
2 Claims

ABSTRACT OF THE DISCLOSURE

An animal feed made from compressed and partially dehydrated sugar cane leaves and tops and a process for making animal feed from such sugar cane waste products by removing most of the moisture content in order to prevent spoilage and then compressing the material to obtain a more easily handled product.

DESCRIPTION

The present invention relates generally to a roughage feed for ruminants and other grass-eating animals using sugar cane by-product. More specifically, the present invention relates to a cattle feed and a process of making such a feed using what has heretofore been considered the waste product from a sugar cane stripping mill.

In the production of sugar from sugar cane, the sugar cane is normally taken from the field after the field has been burned and the unburned leaves are stripped away. Next, the tops are cut from the stalks and the remaining cane stalks are further treated for the removal of the sugar therein. The leaves, tops and short top pieces of stalk are normally considered a waste product. In their form as they come from the stripping mill they are not suitable as a cattle feed since they cannot be satisfactorily stored. The material still contains a certain quantity of sugar. If it is stored in this unprocessed condition the sugars will invert and the moisture content will cause the material to rapidly mold and even catch fire by spontaneous combustion. In any case the material becomes unpalatable to the animals.

In order to obtain satisfactory storing qualities, it is necessary to reduce the moisture content of the materials to less than 15%. A 10% moisture content has been found to be preferable. The first step in the process is to wash the cane stripping material as it is obtained from the cane cleaning plant or grinding mill to reduce the amount of ash and to remove the dirt. It has been found desirable to reduce the ash to less than 7%. The washing step may be accomplished by water jets in conjunction with a cascading and submerging process to sufficiently agitate the material. It is important to wash the material initially before any chopping of the material takes place in order that none of the valuable nutrient quantities in the material are washed away.

After the material is washed, the next step is to reduce the material to uniform size particles and this is best done by chopping to produce a clean cut. Chopping is preferred to milling or grinding as the latter severely macerates the material causing cellular damage and loss of nutrient juices. It is best to chop the material to about two or three inches in length.

The third step is to dry the chopped leaves and top material which is done by passing the material through a drum heated by a furnace, the temperature of which is controlled to insure proper drying without burning. It has been found that the temperature range should be about 1200° to 1800° F., depending upon the quantity which is fed to the drum and its moisture content.

The next step is to remove the lighter material which is fully dried from the heavier sections such as the short pieces of cane which may still contain substantial moisture. This separation can be done by an air separator using a vacuum to pick off the light dry leafy particles. The small top pieces of cane still contain sugar and they may be conveyed back to the mill for processing for their sugar content, or left in the dryer until sufficiently dehydrated.

It may be desirable to recut the dried material in a smaller chopper and size the particles to ½ to 1½" so that uniform pellets may be made.

The next step is to pelletize the recut materials by pressing them into pellets. At this point, no additional moisture need be added in order to retain the compressed form of the material since the sugars inherent in the material act as a binder. The size of the pellets may vary but some of them should be at least 1" in length or longer since ruminant animals require these longer particle sizes to aid in their digestive systems.

The final step is to convey the compressed pellets to a cooling area where they are allowed to sweat for a short period before they are used or stored.

By this process for treating sugar cane by-products an improved roughage feed for ruminants and other grass-eating animals is obtained. The digestible nutrients are as high as 50% and therefore an extremely valuable animal feed is provided. In addition, by artificially drying the product uniformity and high quality are attained and long-term storage can be expected without deterioration, a major factor in the production of animal feed.

While a preferred embodiment of this animal feed and the process for making it has been described, it will be obvious to persons skilled in the art that changes or alterations might be made without departing from the invention in its broader aspects and, therefore, it is the aim of the appended claims to cover all such changes and modifications as fall within the true scope and spirit of this invention.

I claim:

1. A process for making animal feed for ruminants from the waste material of a sugar cane stripping mill, the steps comprising:
   stripping sugar cane stalks after the stalks have been burned and removed from the field to recover the leaves, tops and some short pieces of stalk therefrom as said waste material;
   washing the waste material stripped from the stalks to remove accumulated dirt and ash to lower the ash content to approximately seven percent by weight;
   chopping the washed material to substantially reduce particle size to about three inches in length;
   heating the chopped material by passing it through a drum heated to a temperature of about 1200° to 1800° F. to lower the moisture content to approximately ten percent by weight, separating out the particles of lighter material as they are dehydrated and fully dried leaving the larger heavier pieces which are further heated until sufficiently dehydrated, rechopping the dehydrated material to reduce the particle size to ½ to 1½ inches to produce uniform pellets and then;
   compressing the thus dehydrated, chopped material into pellets.

2. The process for making animal feed as described in claim 1 wherein said compressing step is followed by cooling said pellets allowing them to sweat prior to storing the same.

References Cited

UNITED STATES PATENTS

| | | | |
|---|---|---|---|
| 704,698 | 7/1902 | Edison | 99—8X |
| 2,227,246 | 12/1940 | Chuck | 99—154 |
| 2,274,905 | 3/1942 | Lewis | 99—8 |
| 2,295,287 | 9/1942 | Muench | 99—8D |
| 2,487,162 | 11/1949 | Meyer et al. | 99—2 |
| 2,810,181 | 10/1957 | Ruckstuhl | 99—8 |
| 2,892,717 | 6/1959 | McLellan | 99—2X |
| 2,995,445 | 8/1961 | Briggs et al. | 99—8 |
| 3,044,877 | 7/1962 | Lent | 99—8 |
| 3,172,764 | 3/1965 | Biehl | 99—9X |

FOREIGN PATENTS

| | | | |
|---|---|---|---|
| 5,753 | 2/1910 | Great Britain | 99—8D |

OTHER REFERENCES

Hackh's Chemical Dictionary (3rd edition) p. 94.

NORMAN YUDKOFF, Primary Examiner

F. E. DRUMMOND, Assistant Examiner

U.S. Cl. X.R.

99—154, 202, 204, 206